United States Patent
Nagaoka et al.

(10) Patent No.: US 9,422,848 B2
(45) Date of Patent: Aug. 23, 2016

(54) INTERNAL COMBUSTION ENGINE AND CONTROL METHOD FOR SAME

(71) Applicant: ISUZU MOTORS LIMITED, Tokyo (JP)

(72) Inventors: Daiji Nagaoka, Kamakura (JP); Masashi Gabe, Tama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 14/364,548

(22) PCT Filed: Nov. 20, 2012

(86) PCT No.: PCT/JP2012/080068
§ 371 (c)(1),
(2) Date: Jun. 11, 2014

(87) PCT Pub. No.: WO2013/088922
PCT Pub. Date: Jun. 20, 2013

(65) Prior Publication Data
US 2014/0325963 A1    Nov. 6, 2014

(30) Foreign Application Priority Data

Dec. 12, 2011  (JP) .................................. 2011-271257

(51) Int. Cl.
*F01N 3/00*    (2006.01)
*F01N 3/20*    (2006.01)
(Continued)

(52) U.S. Cl.
CPC ............ *F01N 3/2066* (2013.01); *F01L 13/00* (2013.01); *F01N 3/035* (2013.01); *F01N 3/106* (2013.01);
(Continued)

(58) Field of Classification Search
CPC .... F02D 41/029; F01N 9/002; F01N 3/0842; F01N 3/035; F01N 13/02
USPC ............... 60/273, 274, 285, 295; 123/90.15, 123/90.18, 345, 346, 347, 348
See application file for complete search history.

(56) References Cited

U.S. PATENT DOCUMENTS 5,826,425 A * 10/1998 Rossi Sebastiano ... F01N 3/023
                                                          60/274
7,322,340 B2 * 1/2008 Ohga .................... F02D 41/402
                                                         123/299

(Continued)

FOREIGN PATENT DOCUMENTS

| GB | 2 267 310 A | 12/1993 |
|---|---|---|
| JP | 2000-170556 | 6/2000 |

(Continued)

OTHER PUBLICATIONS

Machine Translation of JP-2000-170556, Translated on Jul. 23, 2015.*

(Continued)

*Primary Examiner* — Patrick Maines
(74) *Attorney, Agent, or Firm* — Staas & Halsey LLP

(57) ABSTRACT

An engine exhaust gas post-treatment device including a mechanism that can vary opening timing of an exhaust valve, and a control method. A unit is configured to raise a temperature of a part or all of the device to not less than a preset temperature by the mechanism opening the exhaust valve in an exhaust stroke at normal combustion within a range of an afterburning period, and the mechanism feeds the device an exhaust gas whose temperature and pressure are high due to combustion of fuel injected into a cylinder. After the exhaust gas is treated by the device, or when the device is regenerated, the unit adds an unburned fuel component to the exhaust gas by an additional injection of an injector in the cylinder or an injection of a hydrocarbon addition nozzle provided at an exhaust port in accordance with the valve opening timing by the unit.

16 Claims, 7 Drawing Sheets

(51) Int. Cl.
  *F01N 3/10*    (2006.01)
  *F01N 3/035*   (2006.01)
  *F02D 41/02*   (2006.01)
  *F02D 41/40*   (2006.01)
  *F01N 13/00*   (2010.01)
  *F01L 13/00*   (2006.01)
  *F01N 3/36*    (2006.01)
  *F02D 13/02*   (2006.01)
  *F02D 41/00*   (2006.01)

(52) U.S. Cl.
  CPC ............ *F01N 3/208* (2013.01); *F01N 3/2033* (2013.01); *F01N 3/36* (2013.01); *F01N 13/0097* (2014.06); *F02D 41/025* (2013.01); *F02D 41/027* (2013.01); *F02D 41/0245* (2013.01); *F02D 41/405* (2013.01); *F01N 2250/04* (2013.01); *F01N 2430/10* (2013.01); *F01N 2610/02* (2013.01); *F01N 2900/1602* (2013.01); *F02D 13/0242* (2013.01); *F02D 41/029* (2013.01); *F02D 2041/001* (2013.01); *F02D 2200/0802* (2013.01); *F02M 26/05* (2016.02); *Y02T 10/24* (2013.01); *Y02T 10/26* (2013.01); *Y02T 10/44* (2013.01)

(56)  References Cited

U.S. PATENT DOCUMENTS

2004/0244362 A1* 12/2004 Hiranuma et al. .............. 60/276
2013/0167508 A1* 7/2013 Nishimura .................... 60/274
2014/0305101 A1* 10/2014 Katou .................. F02D 41/3094
                                                      60/285

FOREIGN PATENT DOCUMENTS

| JP | 2000170556 A * | 6/2000 | ............ F02D 13/02 |
| JP | 2003-3831 | 1/2003 | |
| JP | 2005-83351 | 3/2005 | |
| JP | 2007-162585 | 6/2007 | |
| JP | 2007162585 A * | 6/2007 | |
| JP | 2008-215127 | 9/2008 | |
| JP | 2008215127 A * | 9/2008 | |
| JP | 2010-121505 | 6/2010 | |
| JP | 2010121505 A * | 6/2010 | |
| JP | 2010-196569 | 9/2010 | |
| JP | 2010196569 A * | 9/2010 | |
| JP | 4591423 B2 * | 12/2010 | ........... F01N 3/0222 |
| JP | 2011-127471 | 6/2011 | |
| JP | 2011127471 A * | 6/2011 | |
| WO | WO 2011030433 A1 * | 3/2011 | |
| WO | 2011/135608 A1 | 11/2011 | |

OTHER PUBLICATIONS

Machine Translation of JP-2010-121505, Translated on Jul. 23, 2015.*
Machine Translation of WO-2011-030433, Translated on Jul. 23, 2015.*
International Search Report mailed Feb. 5, 2013 in corresponding International Patent Application No. PCT/JP2012/080068.

* cited by examiner

INTERNAL COMBUSTION ENGINE AND CONTROL METHOD FOR SAME

CROSS-REFERENCE TO RELATED APPLICATIONS

This application claims the benefit under 35 U.S.C. Section 371, of PCT International Application No. PCT/JP2012/080068, filed Nov. 20, 2012, and under 35 U.S.C. §119 of Japanese Application No. 2011-271257, filed Dec. 12, 2011, the contents of which are incorporated herein by reference.

TECHNICAL FIELD

The present invention relates to an internal combustion engine provided with: a post-treatment device that treats an exhaust gas; and a variable valve mechanism that can freely change valve opening timing of an exhaust valve, and a control method for the internal combustion engine.

BACKGROUND ART

Currently, as post-treatment devices that treat an exhaust gas of an engine (internal combustion engine), there are included a DPF (diesel particulate filter) that collects PM (particulate matter), and catalyst devices, such as a deNOx catalyst (nitric oxide compound reduction catalyst), a DOC (diesel oxidation catalyst), and a urea SCR catalyst (urea selective catalytic reduction). When a post-treatment device is actually provided in an exhaust passage of the engine, the above-described devices are combined with each other to purify the exhaust gas (for example, refer to Patent Documents 1, 2, and 3).

In the exhaust gas being purified by this post-treatment device, it is important to raise an exhaust gas temperature to a high temperature of approximately 200 to 250° C., and to activate the catalyst of the catalyst device. In addition, in PM collected by the DPF being burned, and the DPF being regenerated, it is necessary to feed fuel, burn it, and to raise a temperature of the fuel.

Consequently, a post injection immediately after a main injection is performed by an injector so that the exhaust gas is made into a high temperature state, and unburned fuel is discharged from an exhaust valve.

When performed in a state where an exhaust gas temperature in a cylinder is decreased, this post injection causes a problem that fuel adheres to a cylinder liner to be diluted in oil, and that durability of the engine is deteriorated. In addition, there is also a problem that thermal decomposition of feed fuel does not proceed, either, and that decomposition to a hydrocarbon (HC) component favorable for the catalyst does not proceed, since the fuel is injected into the cylinder in a low-pressure and low-temperature state.

Although there is also a method to add the HC directly to an exhaust pipe for dealing with this problem, and fuel dilution in the oil can be prevented by this method, an injection is performed to the exhaust pipe with a lower-temperature and a lower-pressure than an inside of the cylinder, and thus a problem cannot be solved that thermal decomposition of the fuel takes more time than the post injection.

PRIOR ART DOCUMENT

Patent Document 1: Japanese patent application Kokai publication No. 2003-003831

Patent Document 2: Japanese patent application Kokai publication No. 2005-083351

Patent Document 3: Japanese patent application Kokai publication No. 2011-127471

SUMMARY OF THE INVENTION

The present invention has been made in view of the above-described problems, and an object thereof is to provide an internal combustion engine that promotes early temperature rise of a post-treatment device to treat an exhaust gas, and that can feed an exhaust gas containing a large percentage of unburned fuel component to the post-treatment device only by adding a few configurations to a conventional configuration, or without adding anything, and a control method for the internal combustion engine.

An internal combustion engine of the present invention for solving the above-described object, the internal combustion engine being provided with a post-treatment device of an exhaust gas, and a variable valve mechanism that can freely change valve opening timing of an exhaust valve, is configured to be provided with: a unit configured to raise a temperature of a part or all of the post-treatment device to not less than a preset temperature by the variable valve mechanism opening the exhaust valve that is opened in an exhaust stroke at the time of normal combustion within a range of an afterburning period, and feeding to the post-treatment device an exhaust gas whose temperature and pressure have become high by means of combustion of fuel injected into a cylinder, when the exhaust gas is treated by the post-treatment device, or when the post-treatment device is regenerated; and a unit configured to add an unburned fuel component to the exhaust gas by at least either an additional injection of a fuel injection valve in a cylinder or an injection of an addition valve provided in an exhaust passage in accordance with valve opening timing of the exhaust valve in the unit configured to perform temperature rise, after the temperature of the part or all of the post-treatment device is raised to not less than the preset temperature.

According to this configuration, the exhaust gas whose temperature has become high can be fed to the post-treatment device (DPF, catalyst), and a temperature of the catalyst of the post-treatment device can be rapidly raised only by adding a few configurations to a conventional configuration, or only by changing opening and closing timing of the exhaust valve without adding anything. In addition, after that, an unburned fuel component (hereinafter referred to as an HC component) is added to an exhaust gas by at least either the additional injection of the fuel injection valve or the injection of the addition valve, and thereby the exhaust gas containing a large percentage of HC components can be fed to the post-treatment device.

Therefore, the HC component in which thermal decomposition has proceeded can be fed to the catalyst of the post-treatment device, and fuel for DPF regeneration in a high-temperature state can be fed. As a result of this, since decomposition of HC can be promoted before the HC is fed to the catalyst, a noble metal amount of the catalyst can be decreased, and cost can be reduced. In addition to that, since dependence on the catalyst of HC decomposition becomes low, regeneration of the post-treatment device can be stably performed even though the catalyst deteriorates.

In addition, when in the above-described internal combustion engine, timing of valve opening of the exhaust valve is set to be 20° ATDC to 50° ATDC, which is in an early stage of an expansion stroke and within a range of the afterburning period, and timing of valve closing of the exhaust valve is set to be 50° ATDC to 90° ATDC before a bottom dead center, the exhaust valve is opened at timing when the cylinder becomes a state of the high-temperature and the high-pressure by the main injection after the start of the afterburning period (approximately to ATDC 15°), i.e., in a very early stage of the expansion stroke (ATDC 20° to 50°), thereby the exhaust gas containing the unburned fuel is fed to the post-treatment device at a very high temperature (800° C. to 400° C.), and early temperature rise of the catalyst and PM regeneration can be performed.

In addition, the exhaust valve is closed before the bottom dead center, and thereby it can be prevented that the inside of the cylinder becomes a negative pressure, and the exhaust gas is suctioned back after the exhaust valve is opened in an initial stage of the expansion stroke. After this, the exhaust valve performs normal opening and closing in the exhaust stroke, and discharges the burned exhaust gas.

In addition to that, when in the above-described internal combustion engine, within a range from the timing of the valve opening to the timing of the valve closing of the exhaust valve by the unit configured to perform temperature rise, set are timing to start the additional injection of the fuel injection valve and timing to end it, or timing to start the injection of the addition valve and timing to end it, decomposition of HC is promoted under the high temperature and the high pressure, and an exhaust gas in a state where the HC is gasified can be fed to the post-treatment device. Consequently, the unburned fuel can be prevented from adhering to an inside of a cylinder.

Moreover, when an exhaust port of any one cylinder of a multi-cylinder internal combustion engine is provided with the addition valve in the above-described internal combustion engine, an addition agent can be injected in a state where the exhaust gas is kept to have a high temperature, and thus gasification of the HC component can be promoted. In addition, in a case of the multi-cylinder internal combustion engine, when promotion of gasification therein is taken into consideration, the HC component can be gasified most efficiently if the exhaust port of any one cylinder is provided with the addition valve.

Furthermore, when in the above-described internal combustion engine, a urea SCR catalyst is contained in the post-treatment device, and the exhaust port is provided with a urea addition valve that injects urea water within the range from the timing of the valve opening to the timing of the valve closing of the exhaust valve by the unit configured to perform temperature rise, decomposition of urea is promoted under the high temperature, and a deNOx effect can be improved immediately after the start-up.

Furthermore, when in the above-described internal combustion engine, provided is a unit configured to increase the main injection amount of the fuel injection valve so as to compensate torque that lowers by the exhaust valve being opened once when the unit configured to perform temperature rise is performed, torque that lowers by once opening the exhaust valve in the early stage of the expansion stroke can be corrected by increasing the main injection amount. At this time, a correction amount to produce the same torque as the time of normal combustion may be preferably referenced from a correction amount map with respect to engine revolution and a fuel injection amount.

In addition, a control method of an internal combustion engine for solving the above-described problems, the control method of the internal combustion engine being provided with a post-treatment device of an exhaust gas, is characterized in that when the exhaust gas is treated by the post-treatment device, or when the post-treatment device is regenerated, an exhaust valve that is opened in an exhaust stroke at the time of normal combustion is opened within a range of an afterburning period, an exhaust gas whose temperature and pressure have become high is fed to the post-treatment device by means of combustion of fuel injected into a cylinder; and an unburned fuel component is added to the exhaust gas by an additional injection of a fuel injection valve in a cylinder, or by an addition valve provided at an exhaust passage in accordance with timing of valve opening of the exhaust valve, after a temperature of a part or all of the post-treatment device is raised to not less than a predetermined temperature.

According to this method, an operational effect similar to the above can be obtained only by adding a few configurations to the conventional configuration, or without adding anything. Therefore, since additional cost is hardly needed, manufacturing cost can be reduced.

According to the present invention, early temperature rise of the post-treatment device that treats an exhaust gas is promoted, and an exhaust gas containing a large percentage of unburned fuel components can be fed to the post-treatment device only by adding the few configurations to the conventional configuration, or without adding anything.

DETAILED DESCRIPTION

Figure 1:
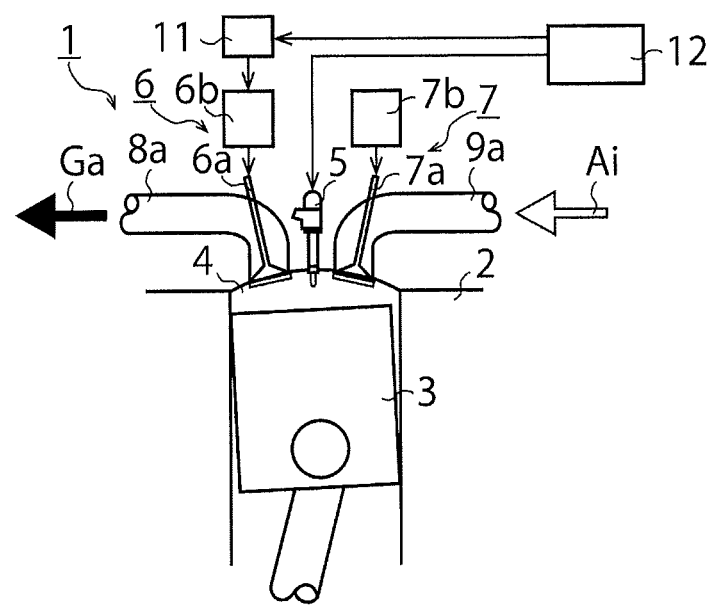
FIG. 1 is a cross-sectional diagram showing a cylinder of an internal combustion engine of a first embodiment pertaining to the present invention.

Hereinafter, with reference to drawings, will be explained an internal combustion engine and a control method for the same of embodiments pertaining to the present invention. Although the embodiments are explained by taking an in-line four-cylinder diesel engine as an example, the present invention can be applied also to a gasoline engine without limiting to a diesel engine, and neither the number of cylinders nor the array of the cylinders is limited. It is to be noted that sizes in the drawings are changed so that configurations are easily understood, and that ratios of a board thickness, a width, a length, etc. of each member and each component are not necessarily made to coincide with ratios of actually manufactured ones.

First, an internal combustion engine of a first embodiment pertaining to the present invention will be explained with reference to FIGS. 1 and 2. First, will be explained a cylinder of an engine (internal combustion engine) of the first embodiment pertaining to the present invention shown in FIG. 1. A cylinder 1 of a multi-cylinder engine is provided with a piston 3 that reciprocates inside a cylinder liner 2.

A combustion chamber 4 is provided at an upper part of this piston 3, and the combustion chamber 4 is provided with: an injector (fuel injection valve) 5 that injects fuel into the combustion chamber 4; an exhaust valve device 6 that discharges an exhaust gas Ga from the combustion chamber 4; and an intake valve device 7 that feeds an air Ai to the combustion chamber 4.

The injector 5 is a fuel injection valve capable of a multi-stage injection in which an after injection (additional injection) is performed at least after a main injection, and may be configured to perform a pilot injection and a pre-injection before the main injection.

The exhaust valve device 6 opens and closes an exhaust valve 6a by a valve driving device 6b, and discharges the exhaust gas Ga to an exhaust port 8a. The valve driving device 6b is connected to a variable valve timing mechanism (variable valve mechanism) 11, and can freely change valve opening and valve opening timing of the exhaust valve 6a.

As for this variable valve timing mechanism 11, for example, when the valve driving device 6b is formed by a cam mechanism, the variable valve timing mechanism 11 is formed by a device that advances or delays a cam mechanism from a crankshaft by a hydraulic pressure. This is what is called a phase-change type variable valve timing mechanism. When timing of the valve opening of the exhaust valve 6a is varied, phases of the crankshaft and a cam shaft are advanced or delayed by a hydraulic pressure of a hydraulic chamber provided between a cam pulley and the cam shaft, and thereby the timing of the valve opening of the exhaust valve 6a is varied.

The valve driving device 6b and the variable valve timing mechanism 11 are not limited to have the above-described configurations, and for example, a cam mechanism having a plurality of cams is provided at the valve driving device 6b, and a device that switches the plurality of cams may be used for the variable valve timing mechanism 11, or a solenoid electromagnetic valve may be used for the exhaust valve device 6.

The intake valve device 7 opens and closes an intake valve 7a by a valve driving device 7b, and feeds the air Ai from an intake port 9a. The valve driving device 7b uses an electromagnetic driving device etc. in which a plunger is provided at a cam mechanism or a solenoid. This valve driving device 7b can use a valve driving device of a well-known technology.

The injector 5 and the variable valve timing mechanism 11 are configured so that operation thereof is controlled by an ECU (control device) 12 called an engine control unit, respectively. This ECU 12 is a microcontroller that comprehensively performs electric control, which is connected to various sensors and is in charge of control of an engine 10 by an electric circuit, and controls a fuel injection amount and fuel injection of the injector 5 via a signal line 5a, and the valve opening timing of the exhaust valve 6a in this embodiment.

Figure 2:
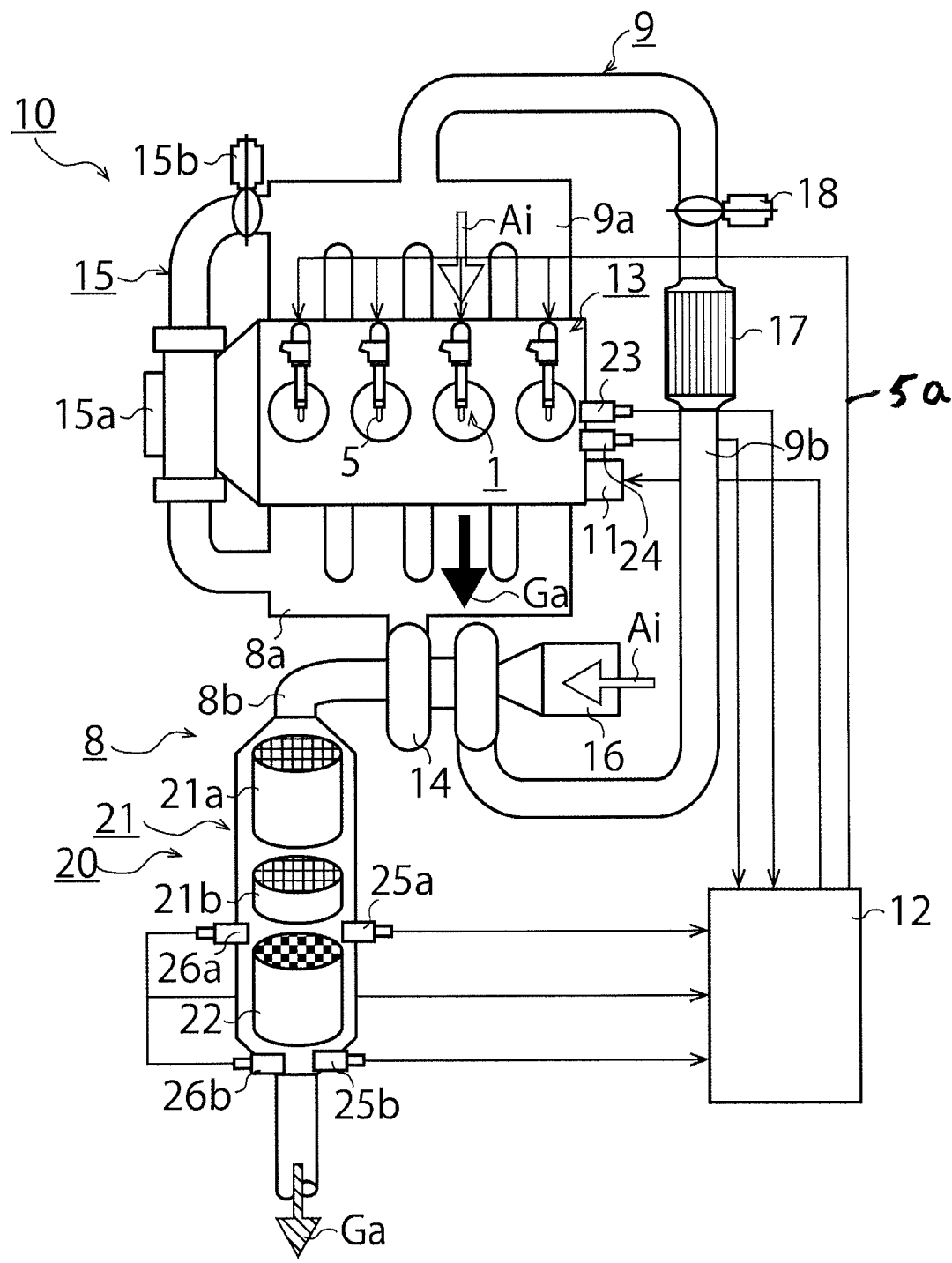
FIG. 2 is a schematic diagram showing the internal combustion engine of the first embodiment pertaining to the present invention.

As shown in FIG. 2, the engine 10 of this embodiment has the above-described cylinder 1 provided at an engine body 13 including a cylinder block and a cylinder head, and is provided with: an exhaust passage 8 including the exhaust port 8a and an exhaust manifold 8b; and an intake passage 9 including the intake port 9a and an intake manifold 9b. In addition to that, the engine 10 is provided with a turbocharger 14, and an EGR system (exhaust gas recirculation device) 15 provided with an EGR cooler 15a and an EGR valve 15b.

A post-treatment device 20 that treats an exhaust gas is provided at the exhaust passage 8, and the post-treatment device 20 is provided with a catalyst device 21 and a DPF 22. The catalyst device 21 includes a deNOx catalyst (nitric oxide compound reduction catalyst) 21a having a lean NOx trap (LNT), catalyst, and a DOC (diesel oxidation catalyst) 21b. The intake passage 9 is provided with an air filter 16, an intercooler 17, and an intake throttle 18.

In addition, as sensors connected to the above-mentioned ECU 12, the engine 10 is provided with a crank angle sensor 23, a cam angle sensor 24, DPF temperature sensors 25a and 25b, and DPF differential pressure sensors 26a and 26b. The ECU 12 adjusts injection timing of the injector 5, and the valve opening timing of the exhaust valve 6a using a crank angle detected by the crank angle sensor 23 and a cam angle detected by the cam angle sensor 24. Although various sensors are provided at the engine 10 in addition to these, they are omitted in the explanation of the embodiments.

A configuration of the above-described engine 10 is well-known, and a well-known technology can be used also for each device. In this embodiment, the exhaust passage 8, there is provided the post-treatment device 20 with at least the catalyst device 21, such as the deNOx catalyst 21a and the DOC 21b, and the DPF 22, and there is provided the variable valve timing mechanism 11 that can freely change the valve opening timing of the exhaust valve 6a, but other configurations are possible.

Next, operation of the engine 10 will be explained with reference to FIGS. 3(*a*), 3(*b*) and FIG. 4. Here, a premixing combustion period in an initial stage of an injection before a top dead center of combustion is defined as PB, a diffusion combustion period of main combustion is DB, and an afterburning period, which is a period when unburned fuel injected in an initial stage of an expansion stroke burns, is AB. In addition, start timing of a main injection of the injector 5 is defined as A1, end timing thereof is A2, valve opening timing of the exhaust valve 6a in the expansion stroke is A3, valve closing timing thereof is A4, and valve opening timing of the exhaust valve 6a in an exhaust stroke is A5.

Figure 3:
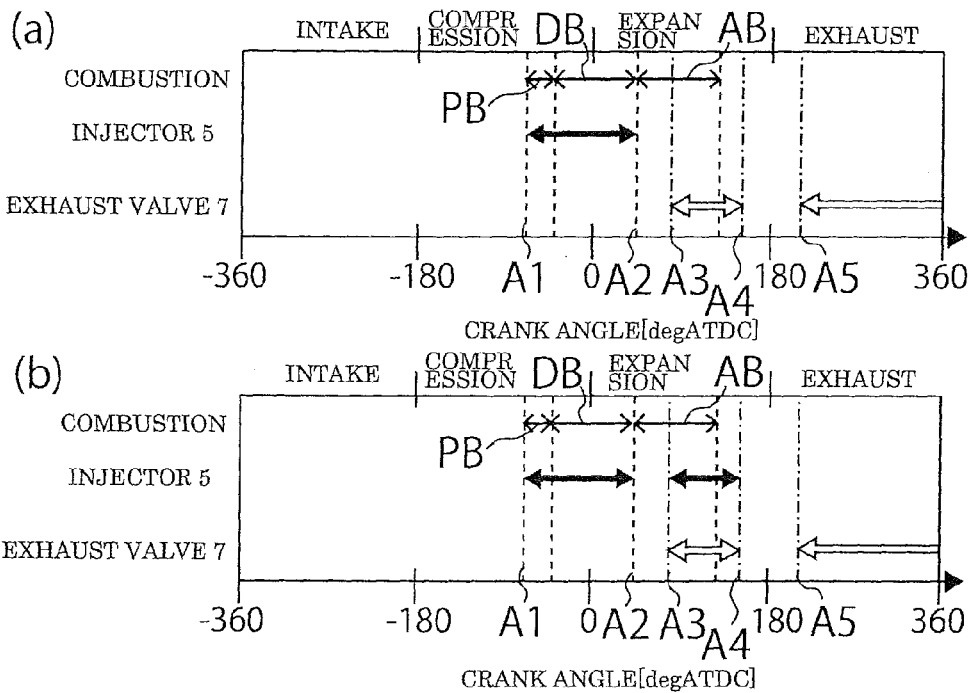
FIGS. 3(a) and 3(b) are illustrations showing operation of an injector and an exhaust valve of the internal combustion engine shown in FIG. 1, a unit configured to raise a temperature of a post-treatment device is shown in FIG. 3(a), and a unit configured to feed unburned fuel to the post-treatment device is shown in FIG. 3(b).

When a temperature of the post-treatment device 20 is raised, or when PM of the DPF 23 is burned and regenerated, first, as shown in FIG. 3(*a*), the ECU 12 controls the variable valve timing mechanism 11, with the timing of an injection of the injector 5 being kept as normal injection timing, and opens and closes the exhaust valve 6a at timing different from timing performed in a normal exhaust stroke.

Next, the injector 5 performs a main injection from the injection start timing A1 to the injection end timing A2. Subsequently, the afterburning period AB starts with the injection end timing A2. The ECU 12 opens the exhaust valve 6a within a range of the afterburning period AB. The valve opening timing A3 of the exhaust valve 6a at this time is the timing immediately after the afterburning period AB starts, in an early stage of the expansion stroke.

In this embodiment, the afterburning period AB starts with the injection end timing A2, for details, within a range of 0° ATDC to 20° ATDC, and it ends before a bottom dead center (90° ATDC). Consequently, the valve opening timing A3 falls within a range from the start of the afterburning period AB in the early stage of the expansion stroke to the bottom dead center, preferably within a range of 0° ATDC to 90° ATDC, and more preferably within a range of 20° ATDC to 50° ATDC.

Figure 4:
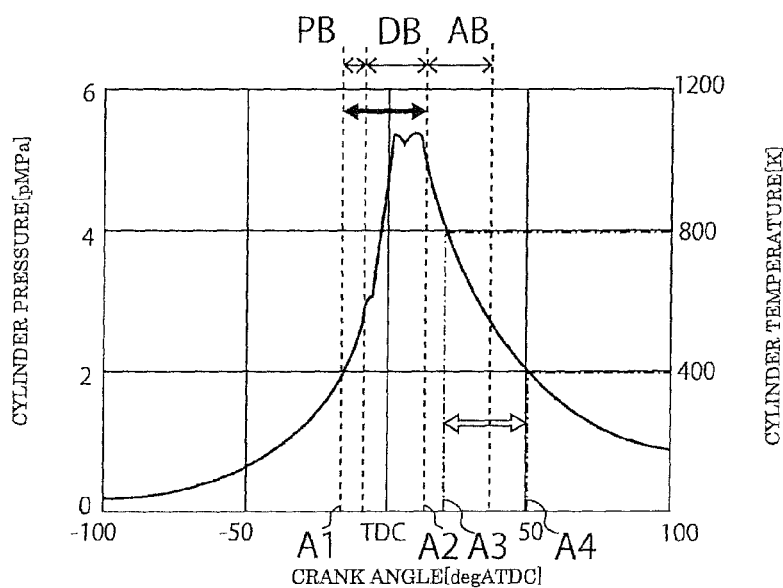
FIG. 4 is a table showing a relation of a crank angle, a cylinder pressure, and a cylinder temperature of the internal combustion engine shown in FIG. 1.

The exhaust valve 6a is opened at the valve opening timing A3 in a very early stage of the expansion stroke, and thereby as shown in FIG. 4, the exhaust gas Ga of a very high exhaust gas temperature (800° C. to 400° C.) can be fed to the post-treatment device 20. In addition, since the valve opening timing A3 also falls within the range of the afterburning period AB, unburned fuel remains in the cylinder 1, and an unburned fuel component (hereinafter referred to as an HC component) gasified under a high temperature and a high pressure can be fed to the post-treatment device 20.

When the exhaust valve 6a is opened in the initial stage of the expansion stroke, conversely, an inside of the cylinder 1 becomes a negative pressure, and the exhaust gas Ga may be suctioned back, and thus the exhaust valve 6a needs to be closed before the bottom dead center at the latest, so that the valve closing timing A4 of the exhaust valve 6a is the timing before the bottom dead center as shown in FIG. 3(a), and it is preferably 50° ATDC to 90° ATDC. Consequently, the exhaust gas Ga can be prevented from being suctioned back into the cylinder 1.

After that, the exhaust valve 6a is opened again at the normal valve opening timing A5, and a remaining burned exhaust gas Ga is discharged. As a result of this, the high-temperature and high-pressure exhaust gas Ga is fed to the post-treatment device 20, and a temperature of a part or all of the catalyst device 21 and the DPF 22 of the post-treatment device 20 are raised to not less than a preset temperature. After that, as shown in FIG. 3(b), the ECU 12 controls the injector 5 without changing the valve opening timing A3 and the valve closing timing A4 of the exhaust valve 6a, and starts an after injection after the main injection.

Start timing and end timing of this after injection may just fall within a range of a period from the valve opening timing A3 to the valve closing timing A4 of the exhaust valve 6a, the timing is set to be substantially the same in this embodiment. Conventionally, when the afterburning period in the initial stage of the expansion stroke is prolonged, an exhaust gas temperature rises, and generation of soot tends to increase. However, since in this embodiment, the exhaust valve 6a is opened, and fuel injected by the after injection is immediately discharged to an exhaust pipe, soot is not generated. Fuel decomposition of the unburned fuel proceeds under the high temperature and the high pressure, and the unburned fuel can be made into the HC component suitable for use in the post-treatment device 20.

According to the above-described operation, since the exhaust valve 6a is opened within the range of the afterburning period AB in the very early stage of the expansion stroke, the exhaust gas Ga that has become the high temperature and the high pressure during the diffusion combustion period DB is fed to the post-treatment device 20 to raise the temperature thereof, and subsequently, the exhaust gas Ga can be fed to the post-treatment device 20 in a state of containing a large percentage of HC component, so that the temperature of the part or all of the post-treatment device 20 is raised. Then, after the temperature rise, the thermally decomposed and gasified HC component can be fed to the catalyst device 21 and the DPF 22.

In addition, regeneration of the PM can be performed in the DPF 22 without performing a post injection, which solves the problems that fuel adheres to the cylinder liner 2, oil is diluted, blow-by gas increases, and durability of the engine 10 is significantly reduced.

As a result of this, the post-treatment device 20 can further obtain the following effects. In the deNOx catalyst 21a, a purification rate can be improved by early temperature rise at the time of cold engine and HC decomposition at the time of a rich air-fuel ratio. In addition, since the fed HC component can be easily burned under the high-temperature exhaust gas Ga in the DOC 21b, and a heat capacity is also small, rapid temperature rise of the catalyst device immediately after start-up etc. can be particularly promoted. In addition to that, since decomposition of the HC component can be promoted in the catalyst device 21, such as the deNOx catalyst 21a and the DOC 21b, a noble metal amount of the catalyst device 21 can be decreased, and cost can be reduced. Furthermore, since dependence on the catalyst of the decomposition of the HC component is low in the DPF 22, PM regeneration can be stably performed even though the catalyst deteriorates.

Moreover, the above-described effects can be obtained with a very little additional cost only by changing the opening and closing timing of the exhaust valve 6a and changing the injection timing of the injector 5 without adding another device.

When an injection amount of the main injection injected from the injector 5 is increased at the time of performing the above-described operation, decrease of torque can be prevented by opening the exhaust valve 6a in the early stage of the expansion stroke. As for the injection amount at this time, in order that the decreased torque due to opening the exhaust valve 6a can be compensated, and that torque equal to torque at the time of normal combustion can be obtained, the ECU 12 is made to store a correction amount map with respect to an engine speed and a fuel injection amount, and the ECU 12 reads the correction amount map at the time of the above-described operation, and corrects the injection amount.

Figure 5:
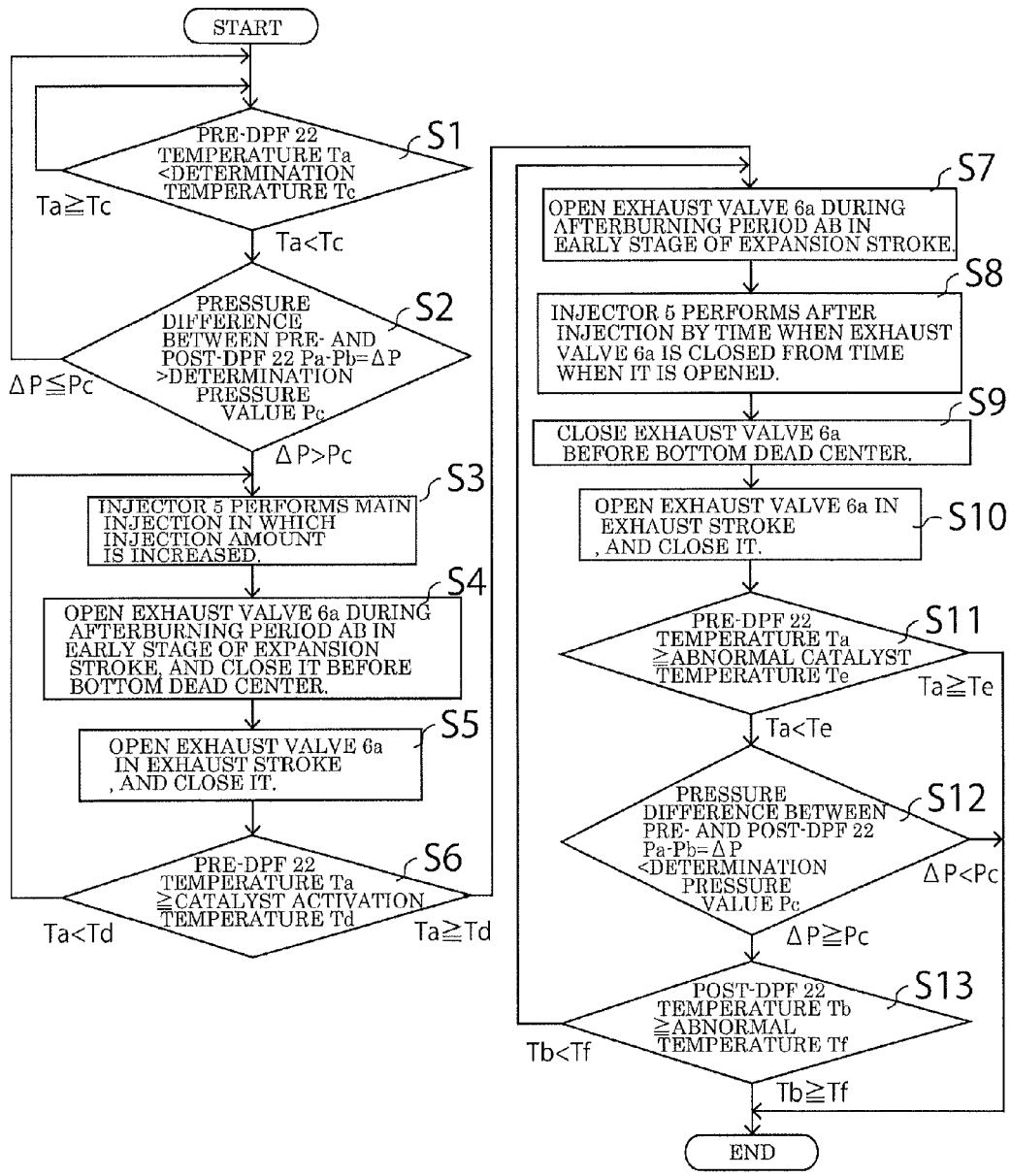
FIG. 5 is a flow chart showing operation of the internal combustion engine shown in FIG. 1.

Next, a control method of the above-described engine 10 will be explained with reference to a flow chart shown in FIG. 5. The control method described in this flow chart is a program computed by the ECU 12. Here, a temperature detected by a DPF sensor 25a provided at an upstream of the DPF 22 is defined as a pre-DPF 22 temperature Ta, a temperature detected by a DPF sensor 25b provided at a downstream of the DPF 22 is a post-DPF 22 temperature Tb, and a pressure difference between pre- and post-DPF 22 detected by the DPF differential pressure sensors 26a and 26b is $\Delta P$.

First, the program performs step S1 in which it is determined whether or not the pre-DPF 22 temperature Ta is lower than a predetermined determination temperature Tc. This determination temperature Tc is the temperature by which it can be determined that a temperature of the catalyst device in the post-treatment device 20 is low. The determination temperature Tc is the temperature that changes with a type of the catalyst device and a configuration inside the exhaust passage 8.

Next, the program performs step S2 in which it is determined whether or not the pressure difference $\Delta P$ between pre- and post-DPF 22 is smaller than a predetermined determination pressure value Pc. If the pressure difference $\Delta P$ between pre- and post-DPF 22 becomes large, it turns out that the DPF 22 is clogged with PM, and thus the determination pressure value Pc is set to be a value by which can be determined a degree where the inside of the DPF 22 is clogged with the PM and thereby a function of the DPF 22 does not lower.

If it is determined in steps S1 and S2 that the pre-DPF temperature Ta is low, i.e., temperature rise of the catalyst device 21 in the post-treatment device 20 is needed, and if it is determined that the pressure difference ΔP between pre- and post-DPF 22 is large, i.e., regeneration of the DPF 22 is needed, next, the program performs step S3 in which the injector 5 performs a main injection in which an injection amount is increased. Lowering of torque generated by subsequently performed strokes is prevented using, as an increased amount of the injection amount, the increased amount corrected by the correction map of the injection amount as mentioned above.

Next, the program performs step S4 in which the exhaust valve 6a is opened during the afterburning period AB in the early stage of the expansion stroke, and is closed before the bottom dead center. Valve opening timing and valve closing timing at this time are defined as the above-mentioned valve opening timing A3 and valve closing timing A4. Subsequently, the program performs step S5 in which the exhaust valve 6a is opened and closed in the exhaust stroke.

Next, the program performs step S6 in which it is determined whether or not the pre-DPF 22 temperature Ta is not less than a catalyst activation temperature Td. If the pre-DPF 22 temperature Ta is lower than the catalyst activation temperature Td in this step S6, i.e., if the temperature of the catalyst device 21 of the post-treatment device 20 has not been sufficiently raised, the program performs steps S3 to S5 again. This catalyst activation temperature Td is the temperature indicated when the temperature of the catalyst device 21 of the post-treatment device 20 becomes not less than a predetermined temperature, changes with a type of the catalyst device 21 of the post-treatment device 20, etc., and is preferably set to fall within a range of 180° C. to 250° C.

When the pre-DPF 22 temperature Ta reaches the catalyst activation temperature Td, next, the program performs step S7 in which the exhaust valve 6a is opened during the afterburning period AB in the early stage of the expansion stroke. Subsequently, the program performs step S8 in which the injector 5 performs an after injection by a time when the exhaust valve 6a is closed from a time when it is opened. Subsequently, the program performs step S9 in which the exhaust valve 6a is closed before the bottom dead center. These steps S7 to S9 are the steps in which the after injection is performed during the above-mentioned step S4. Consequently, the HC component is fed to the catalyst device 21 to be burned, and the temperature of the catalyst device 21 further rises. In addition, the HC component is fed to the DPF 22, and PM is burned.

Next, the program performs step S10 in which the exhaust valve 6a is opened and closed in the exhaust stroke. Next, the program performs step S11 in which it is determined whether or not the pre-DPF 22 temperature Ta is not less than an abnormal catalyst temperature Te. When the pre-DPF 22 temperature Ta becomes not less than the abnormal catalyst temperature Te, the temperature of the catalyst device 21 rises excessively, and the catalyst device 21 breaks down, and thus in this case, the control method is completed. This abnormal catalyst temperature Te is previously stored in the ECU 12, and is preferably set to be 650° C. to 750° C.

In this step S11, abnormal rise of the temperature of the catalyst device 21 may just be determined, and the control method of the present invention is not limited to the above-described one. For example, a heat generation amount may be calculated from a fuel amount injected by the after injection, and may be performed a catalyst temperature estimation step in which a catalyst temperature is estimated together with a characteristics of the catalyst.

If the pre-DPF 22 temperature Ta is lower than the abnormal catalyst temperature Te, next, the program performs step S12 in which it is determined whether or not the pressure difference ΔP between pre- and post-DPF 22 is smaller than the predetermined determination pressure value Pc. If the pressure difference ΔP is smaller than the determination pressure value Pc, PM of DPF 22 has been able to be regenerated, and this control method is completed.

If the pressure difference ΔP is not less than the determination pressure value Pc, next, the program performs step S13 in which it is determined whether or not the post-DPF 22 temperature Tb is not less than an abnormal DPF temperature Tf. When the post-DPF 22 temperature Tb becomes not less than the abnormal DPF temperature Tf, the temperature of the DPF 22 rises excessively, and the DPF 22 breaks down, and thus in this case, the control method is completed. This abnormal DPF temperature Tf is previously stored in the ECU 12, and is preferably set to be 650° C. to 750° C.

According to the above control method of the engine 10, the operational effect mentioned in the above-described operation of the engine 10 can be obtained without adding another new device only by changing the opening and closing timing of the exhaust valve 6a and changing the injection timing of the injector 5. In addition to that, the temperature of the catalyst device 21 and the temperature of the DPF 22 can be monitored, and abnormal temperature rise of each device can be prevented. When the abnormal temperature rise of each device is detected, the temperature of each device may be adjusted using a method to adjust the fuel amount injected by the after injection in the early stage of the expansion stroke or a method to delay valve opening start timing of the exhaust valve 6a apart from the above-described method.

Figure 6:
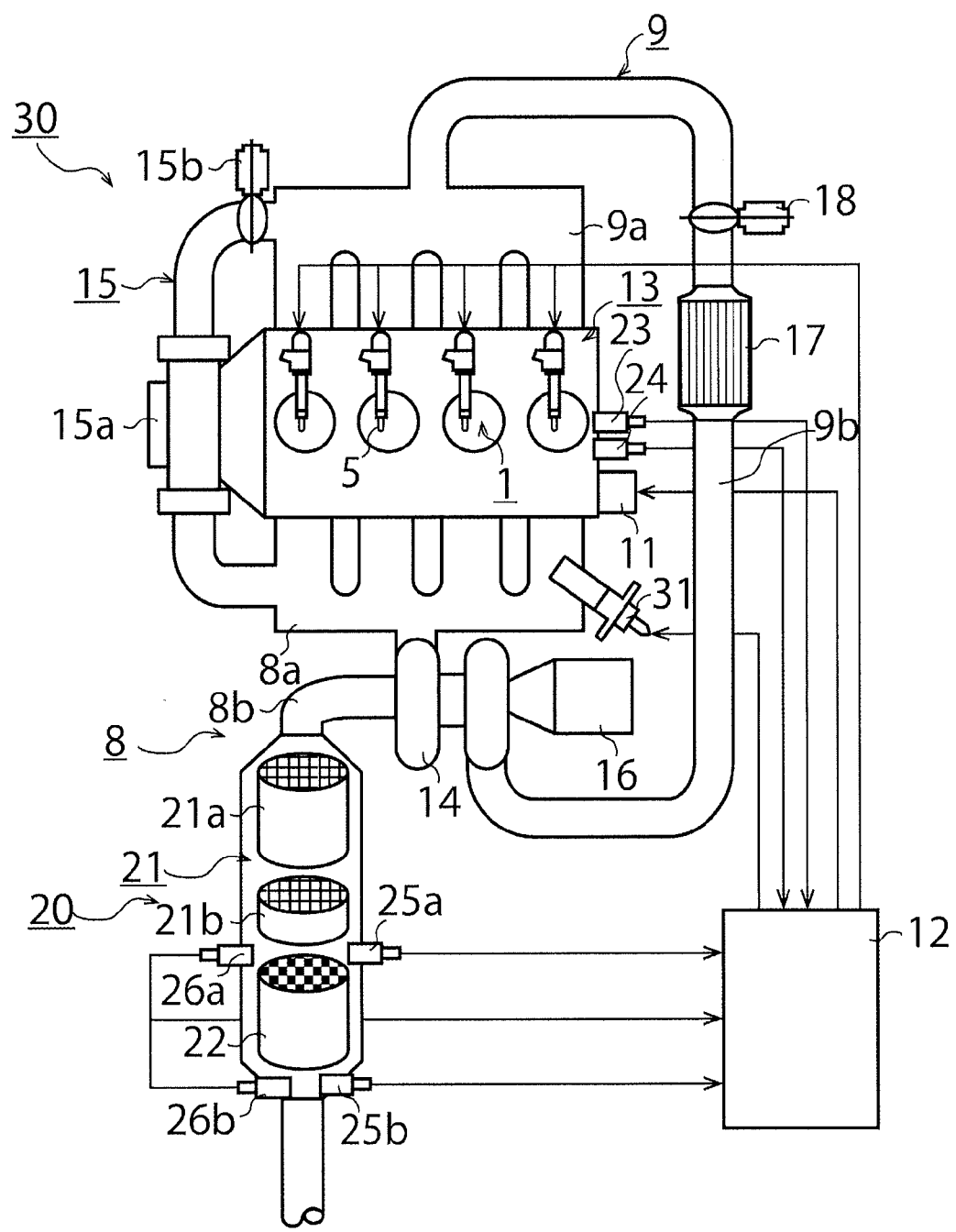
FIG. 6 is a schematic diagram showing an internal combustion engine of a second embodiment pertaining to the present invention.

Next, an engine of a second embodiment pertaining to the present invention will be explained with reference to FIG. 6. An engine 30 is configured to be provided with an HC addition nozzle (addition valve) 31 at the exhaust port 8a in addition to the configuration of the engine of the first embodiment. When the HC addition nozzle 31 is provided as in this embodiment, it may be applied to a case where the injector 5 is a unit injector etc., and does not support multi-stage injection, and a case where a problem of oil dilution occurs when an after injection amount increases even though the multi-stage injection is supported, and further, a case where combustion of the inside of the cylinder is affected when the after injection amount increases, etc.

This HC addition nozzle 31 is preferably provided at the exhaust port 8a near the combustion chamber 4 so that injection can be performed in a state where the exhaust gas Ga is kept to have a high temperature as much as possible, and that gasification can be promoted. In addition, as for the arrangement number of the HC addition nozzles 31, a case is suitable for gasification of the HC component where the exhaust port 8a of any one cylinder 1 is provided with the HC addition nozzle 31 if an engine is a multi-cylinder engine as the engine 30. In addition to that, if it is difficult to attach the HC addition nozzle 31 to the exhaust port 8a, an arrangement position of the HC addition nozzle 31 may be better to be inside the exhaust manifold 8b directly under a turbocharger 14.

As operation of the engine 30, HC is added to the exhaust gas Ga from the HC addition nozzle 31 in addition to the after injection explained in the first embodiment, or without performing the after injection. Injection timing of the HC addition nozzle 31 at this time is set as the timing within the range explained in the above-mentioned additional injection.

According to this configuration, since an operational effect similar to the above can be obtained even though the HC addition nozzle 31 is used instead of the after injection, it becomes possible to apply also to an engine in which the after injection cannot be performed.

Figure 7:
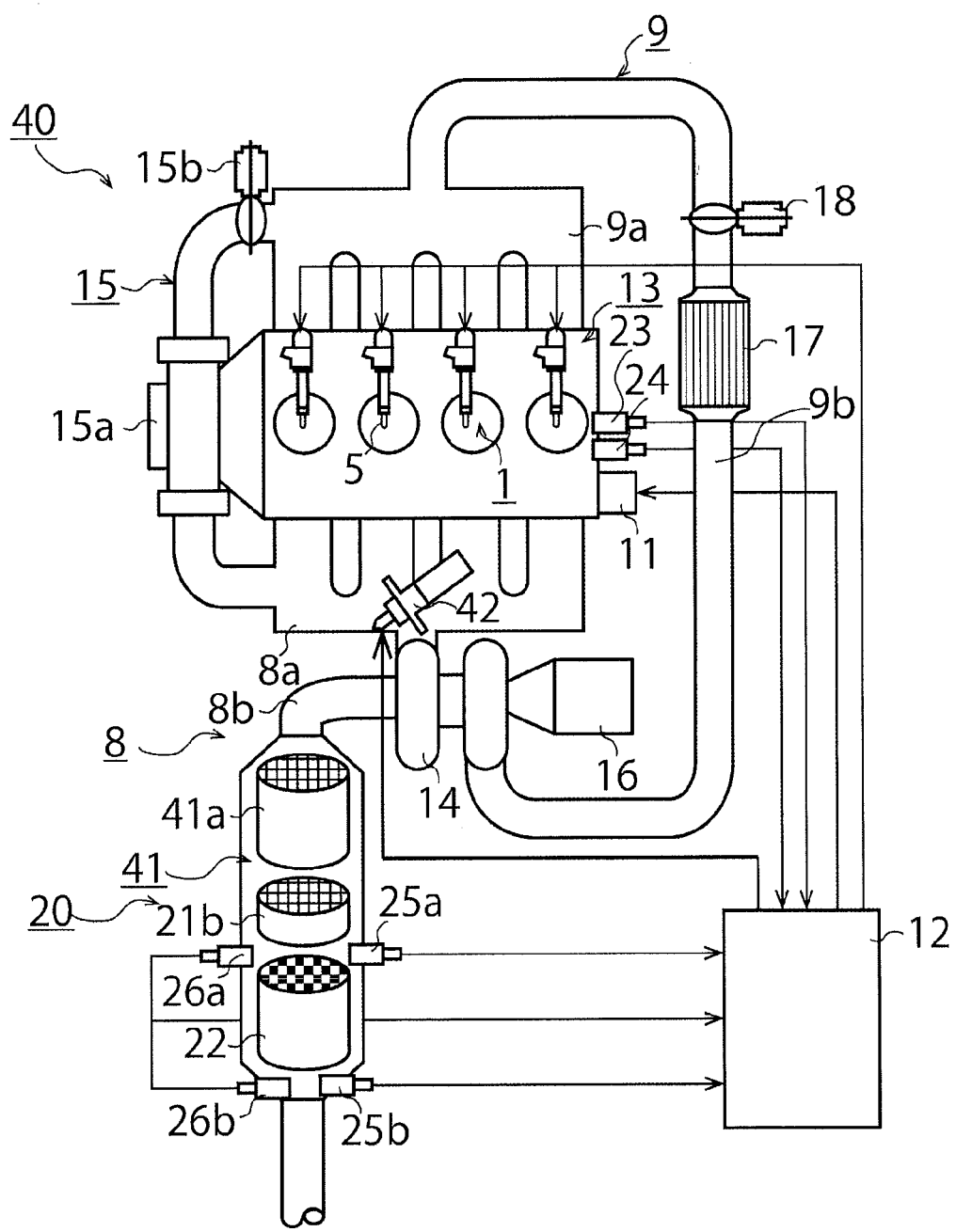
FIG. 7 is a schematic diagram showing an internal combustion engine of a third embodiment pertaining to the present invention.

Subsequently, an engine of a third embodiment pertaining to the present invention will be explained with reference to FIG. 7. An engine 40 is provided with a urea SCR device (urea selective catalytic reduction) 41a, and a urea addition nozzle 42 at the exhaust port 8a instead of the deNOx catalyst of the catalyst device of the post-treatment device of the engine of the first embodiment. This urea addition nozzle 42 is provided at the exhaust port 8a or near the exhaust port 8a, and it is an injection valve that injects urea water at the time of discharge of the high-temperature exhaust gas Ga from the exhaust valve 6a in the early stage of the expansion stroke. Timing of the injection is set to be the timing similar to the above-mentioned HC addition nozzle.

According to this configuration, decomposition of urea is promoted under a high temperature and a high pressure, urea evaporates in the early stage, gasification of ammonia can be promoted, and a deNOx effect can be exerted immediately after the start-up of the engine 40. In addition, since urea water can be prevented from precipitating as a solid substance under a specific temperature, an exhaust pipe is not blocked.

Figure 8:
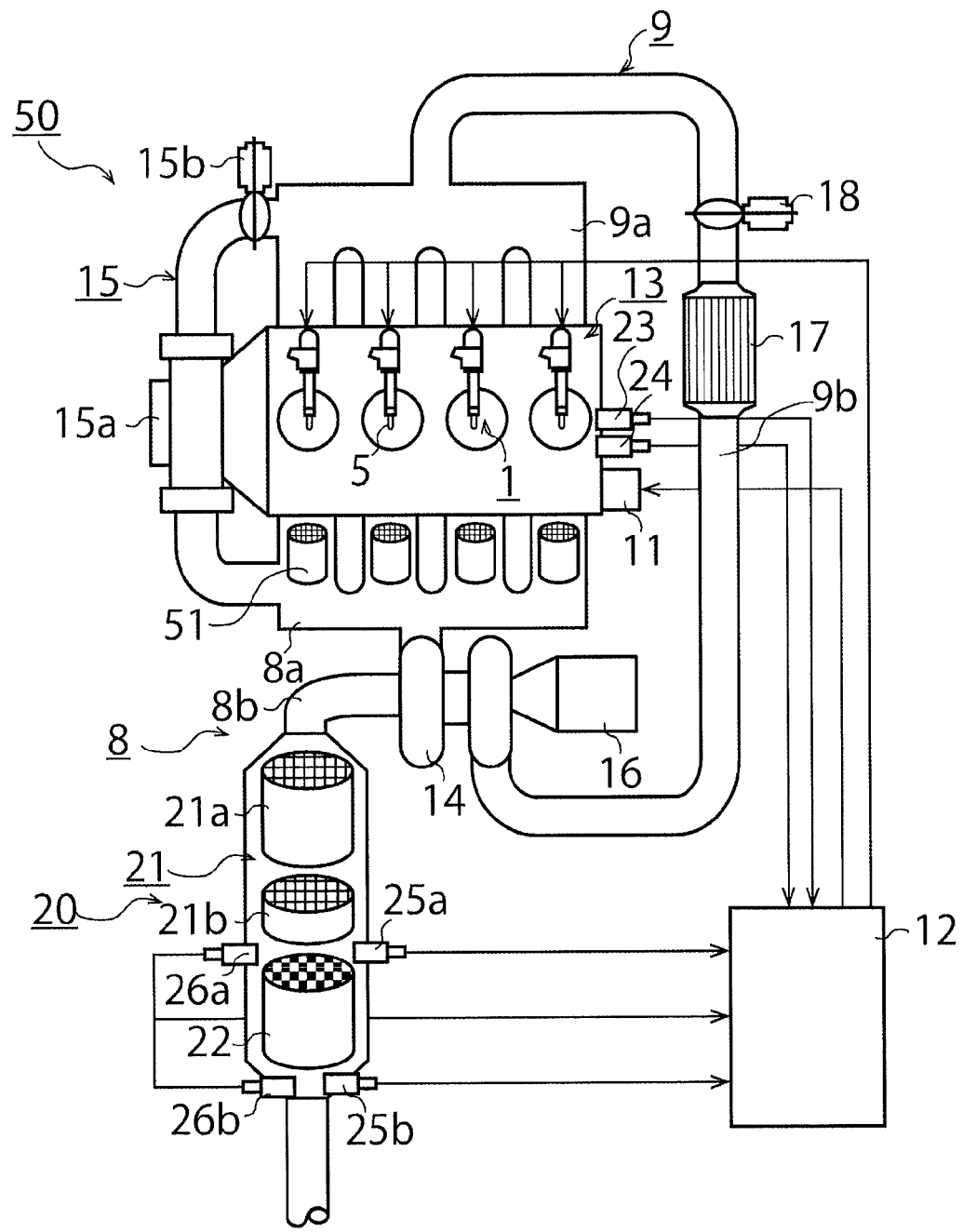
FIG. 8 is a schematic diagram showing an internal combustion engine of a fourth embodiment pertaining to the present invention.

Next, an engine of a fourth embodiment pertaining to the present invention will be explained with reference to FIG. 8. An engine 50 is provided with an in-port oxidation catalyst 51 at each exhaust port 8a in addition to the configuration of the engine of the first embodiment. According to this configuration, since the HC component fed to the in-port oxidation catalyst 51 can be easily burned under a high-temperature exhaust gas, and a heat capacity can also be reduced, particularly, a temperature of the catalyst immediately after start-up can be rapidly raised.

When the above-described first to fourth embodiments are mounted in a vehicle, they may be combined with each other, respectively.

Since an internal combustion engine of the present invention can promote early temperature rise of a post-treatment device that treats an exhaust gas, and can feed an exhaust gas containing a large percentage of unburned fuel component to the post-treatment device without adding a new device or only by adding a few configurations, it can be utilized particularly for a vehicle having a diesel engine mounted thereon.

The invention claimed is:

1. An internal combustion engine, comprising:
a cylinder;
a fuel injection valve which injects a main injection of fuel into the cylinder;
an exhaust passage through which an exhaust gas from the cylinder passes;
a post-treatment device in the exhaust passage to treat the exhaust gas;
a variable valve mechanism that changes a timing of an opening of an exhaust valve of the cylinder;
a sensor which detects a temperature of the post-treatment device; and
a controller which is connected to the sensor and is configured to— control the fuel injection valve and the variable valve mechanism when the exhaust gas is treated by the post-treatment device, or when the post-treatment device is regenerated,
control, by the variable valve mechanism, the exhaust valve to, when the temperature of the post-treatment device is below a preset catalyst activation temperature, open the exhaust valve in a range of an afterburning period set at the initial stage of an expansion stroke and close the exhaust valve before a bottom dead center of the expansion stroke, before opening and closing at an exhaust stroke, and
control, when the temperature of part or all of the post-treatment device is raised to not less than the catalyst activation temperature, the fuel injection valve to perform an after injection between opening of the exhaust valve within the range of the afterburning period and closing the exhaust valve before the bottom dead center of the expansion stroke.

2. The engine according to claim 1, wherein a timing of the opening of the exhaust valve is set to be 20° ATDC to 50° ATDC within the range of the afterburning period, and a timing of the closing of the exhaust valve is set to be 50° ATDC to 90° ATDC, which is before the bottom dead center of the expansion stroke.

3. The engine according to claim 1,
wherein the post-treatment device is provided with a urea selective catalytic reduction catalyst and a urea addition valve in an exhaust port, and
the controller is further configured to control injection of urea water from the urea addition valve from a timing of the exhaust valve opening to a timing of the exhaust valve closing within the range of the afterburning period.

4. The engine according to claim 1, wherein the controller is further configured to increase the main injection amount so as to compensate for lowered torque by the exhaust valve being opened once, when the exhaust valve is opened within the range of the afterburning period.

5. A control method of an internal combustion engine including a post-treatment device to treat an exhaust gas, comprising:
performing a main injection of fuel into a cylinder of the engine;
detecting a temperature of the post-treatment device; and
when the exhaust gas is treated by the post-treatment device, or when the post-treatment device is regenerated,
controlling, an exhaust valve of the cylinder to, when the temperature of the post-treatment device is below a preset catalyst activation temperature, open in a range of an afterburning period set at the initial stage of an expansion stroke and close the exhaust valve before a bottom dead center of the expansion stroke, before opening and closing at the exhaust stroke, and
performing, when the temperature of part of or all of the post-treatment device is raised to not less than the catalyst activation temperature, an after injection between opening of the exhaust valve within the range of the afterburning period and closing the exhaust valve before the bottom dead center of the expansion stroke.

6. The engine according to claim 2,
wherein the post-treatment device is provided with a urea selective catalytic reduction catalyst and a urea addition valve in an exhaust port, and
the controller is further configured to control injection of urea water from the urea addition valve from the timing of the exhaust valve opening to the timing of the exhaust valve closing within the range of the afterburning period.

7. The engine according to claim 2, wherein the controller is further configured to increase the main injection amount of fuel so as to compensate for lowered torque by the exhaust valve being opened once, when the exhaust valve is opened within the range of the afterburning period.

8. The engine according to claim 3, wherein the controller is further configured to increase the main injection amount of fuel so as to compensate for lowered torque by the exhaust valve being opened once, when the exhaust valve is opened within the range of the afterburning period.

9. An engine, comprising:
a cylinder;
a fuel injection valve which injects a main injection of fuel into the cylinder;
an exhaust passage through which an exhaust gas from the cylinder passes;
a post-treatment device in the exhaust passage to treat the exhaust gas;
a variable valve mechanism that changes a timing of an opening of an exhaust valve of the cylinder;
an addition valve in the exhaust passage to inject additional fuel into the exhaust passage;
a sensor which detects a temperature of the post-treatment device; and
a controller which is connected to the sensor and configured to—
control the fuel injection valve, the variable valve mechanism and the addition valve, when the exhaust gas is treated by the post-treatment device, or when the post-treatment device is regenerated,
control by the variable valve mechanism, the exhaust valve to, when the temperature of the post-treatment device is below a preset catalyst activation temperature, open in a range of an afterburning period set at an initial stage of an expansion stroke and close the exhaust valve before a bottom dead center of the expansion stroke, before opening and closing at the exhaust stroke, and
control, when a temperature of part or all of the post-treatment device is raised to not less than the catalyst activation temperature, the addition valve to perform an additional injection at an after-injection timing in the fuel injection valve between opening of the exhaust valve by the variable valve mechanism within the range of the afterburning period and closing the exhaust valve before the bottom dead center of the expansion stroke.

10. The engine according to claim 9, wherein a timing of the opening of the exhaust valve is set to be 20° ATDC to 50° ATDC within the range of the afterburning period, and a timing of the exhaust valve closing is set to be 50° ATDC to 90° ATDC, which is before the bottom dead center of the expansion stroke.

11. The engine according to claim 9,
wherein the post-treatment device is provided with a urea selective catalytic reduction catalyst and a urea addition valve in an exhaust port, and
the controller is further configured to control injection of urea water from the urea addition valve from a timing of the exhaust valve opening to a timing of the exhaust valve closing within the range of the afterburning period.

12. The engine according to claim 9, wherein the control device is configured to increase the main injection amount so as to compensate for lowered torque by the exhaust valve being opened once, when the exhaust valve is opened within the range of the afterburning period.

13. The engine according to claim 10,
wherein the post-treatment device is provided with a urea selective catalytic reduction catalyst and a urea addition valve in an exhaust port, and
the controller is further configured to control injection of urea water from the urea addition valve from the timing of the exhaust valve opening to the timing of the exhaust valve closing within the range of the afterburning period.

14. The engine according to claim 10, wherein the controller is further configured to increase the main injection amount to compensate for lowered torque by the exhaust valve being opened once, when the exhaust valve is opened within the range of an afterburning period.

15. The engine according to claim 11, wherein the controller is further configured to increase the main injection amount to compensate for lowered torque by the exhaust valve being opened once, when the exhaust valve is opened within the range of the afterburning period.

16. A control method of an internal combustion engine including a post-treatment device to treat an exhaust gas, comprising:
performing a main injection of fuel into a cylinder of the engine using a fuel injection valve;
detecting a temperature of the post-treatment device; and
when the exhaust gas is treated by the post-treatment device, or when the post-treatment device is regenerated,
controlling, the exhaust valve to, when the temperature of the post-treatment device is below a preset catalyst activation temperature, open the exhaust valve in a range of an afterburning period set at an initial stage of an expansion stroke and close the exhaust valve before a bottom dead center of the expansion stroke, before opening and closing at the exhaust stroke, and
controlling, when a temperature of part or all of the post-treatment device is raised to not less than the catalyst activation temperature, an addition valve to perform an additional fuel injection at an after-injection timing in the fuel injection valve between opening of the exhaust valve within the range of the afterburning period and closing the exhaust valve before the bottom dead center of the expansion stroke.

* * * * *